United States Patent [19]
Nabeyama et al.

[11] Patent Number: 5,570,227
[45] Date of Patent: Oct. 29, 1996

[54] METHOD AND APPARATUS FOR PREVENTING OCCURRENCE OF SURGE LIGHT IN OPTICAL AMPLIFIER/TRANSMITTER APPARATUS

[75] Inventors: Yoshio Nabeyama, Fukuoka; Hirofumi Araki, Kawasaki, both of Japan

[73] Assignee: Fujitsu Limited, Kanagawa, Japan

[21] Appl. No.: 298,574

[22] Filed: Aug. 31, 1994

[30] Foreign Application Priority Data

Mar. 2, 1994 [JP] Japan ................................ 6-031736

[51] Int. Cl.[6] ............................. H04B 10/00; H01S 3/00; G02F 1/39
[52] U.S. Cl. ................................. 359/341; 359/337
[58] Field of Search ............................ 359/134, 160, 359/187, 194, 337, 341

[56] References Cited

U.S. PATENT DOCUMENTS

| | | |
|---|---|---|
| 4,924,473 | 5/1990 | Burgyan et al. .................. 372/38 |
| 5,088,095 | 2/1992 | Zirngibl . |
| 5,163,063 | 11/1992 | Yoshikawa et al. ............... 372/38 |
| 5,226,051 | 7/1993 | Chan .................................. 372/30 |
| 5,268,786 | 12/1993 | Matsushita et al. ............... 359/341 |
| 5,315,674 | 5/1994 | Asako ................................ 359/341 |
| 5,343,320 | 8/1994 | Anderson .......................... 359/160 |

FOREIGN PATENT DOCUMENTS

| | | |
|---|---|---|
| 4165334 | 6/1992 | Japan . |
| 5041552 | 2/1993 | Japan . |
| 5152661 | 6/1993 | Japan . |
| 2244595 | 12/1991 | United Kingdom . |

*Primary Examiner*—Nelson Moskowitz

[57] ABSTRACT

Disclosed is a method and apparatus for preventing the occurrence of surge light that may be caused by an off-to-on transition of input signal light in an optical amplifier using an erbium-doped optical fiber. An input electrical signal, optical modulator output, leakage light, or light output is monitored to detect the off-to-on transition of the signal light, and the energy level of the input signal light or pumping light is gradually increased from a low level to an operating level.

30 Claims, 14 Drawing Sheets

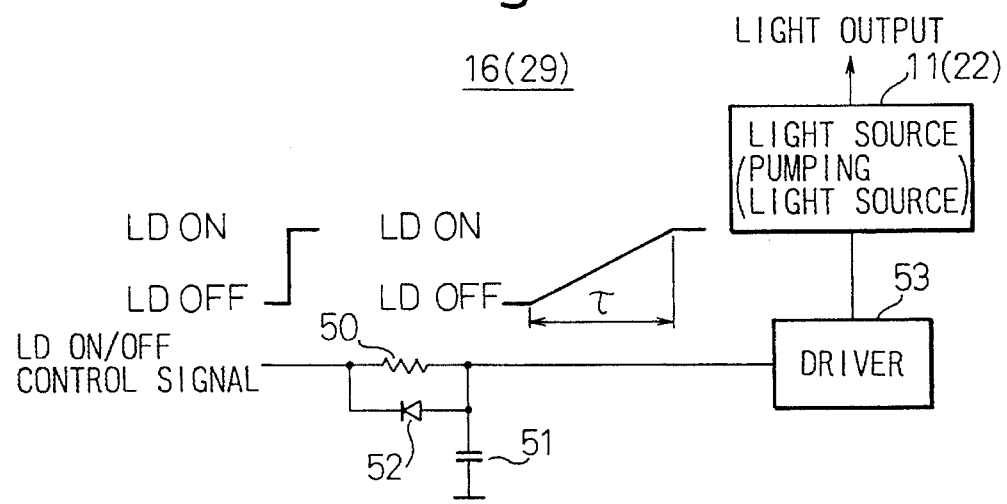
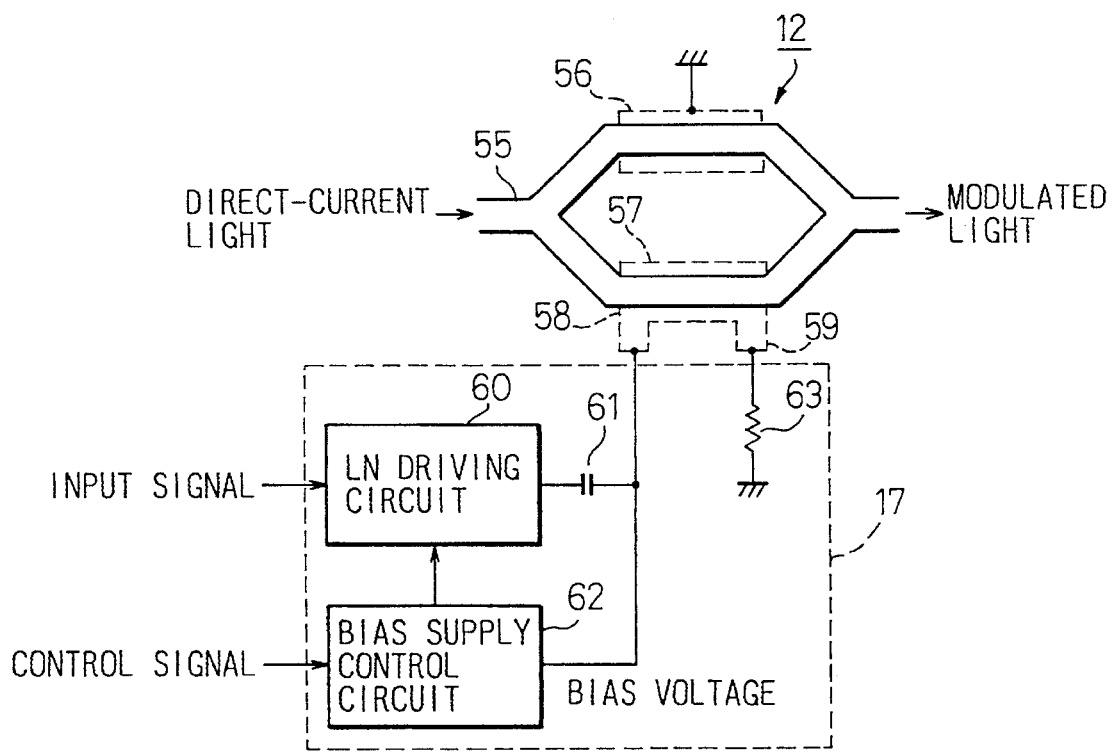

METHOD AND APPARATUS FOR PREVENTING OCCURRENCE OF SURGE LIGHT IN OPTICAL AMPLIFIER/TRANSMITTER APPARATUS

BACKGROUND OF THE INVENTION

1. Field of the Invention

The present invention relates to an optical amplifier/transmitter apparatus using an optical amplifier, and more particularly to a method and apparatus for preventing the occurrence of surge light at the time of signal input to an optical transmitter in such an optical amplifier/transmitter apparatus.

2. Description of the Related Art

In an optical amplifier/transmitter apparatus, there is often employed a system for amplifying an optical signal using an amplifier constructed from an erbium-doped fiber (EDF). Specifically in a transmitting section for transmitting an optical signal, an EDF amplifier is often used in an optical amplifier that is provided to amplify, prior to transmission, an optical signal fed from an optical transmitter that generates signal light in the form of modulated light on the basis of an input electrical signal.

In an EDF amplifier, a situation can occur where the input optical signal remains in the "space" state, i.e., the state of no input optical signal being present, for a prolonged time. In such a case, since pumping light continues to be supplied to the EDF, internal energy continues to increase. In this condition, when the input optical signal changes to "mark", i.e, when signal light is input, the output light level abruptly increases at the rising edge of the signal, producing light surge and causing the internal energy to drop, then settling to produce normally amplified optical signal output.

Such surge light is transmitted via a transmission path to the receiving end, and causes a detrimental effect on the optical receiver that receives the optical signal in the receiving section. That is, because of the excessively high light level, a photodiode (PD) or an avalanche photodiode (APD), constituting an optical detector in the optical receiver for detecting optical signals, is overloaded beyond its allowable level, and may eventually be damaged.

SUMMARY OF THE INVENTION

The present invention is aimed at overcoming such a problem with the prior art, and it is an object of the invention to provide a method and apparatus capable of preventing the occurrence of surge light in a reliable manner in an optical amplifier/transmitter apparatus which performs optical amplification using an EDF.

According to the present invention, there is provided a method of preventing the occurrence of surge light in an optical amplifier that amplifies signal light by introducing the signal light into an optical fiber supplied with pumping light, comprising the steps of: detecting an off-to-on transition of the signal light; and when the off-to-on transition of the signal light is detected, gradually increasing the energy level of either the signal light introduced into the optical fiber or the pumping light supplied to the optical fiber, or of both, from a low level to an operating level.

According to the present invention, there is also provided an apparatus for preventing the occurrence of surge light in an optical amplifier that amplifies signal light by introducing the signal light into an optical fiber supplied with pumping light, comprising: an off-to-on transition detecting circuit for detecting an off-to-on transition of the signal light; and a light level control circuit for gradually increasing the energy level of either the signal light introduced into the optical fiber or the pumping light supplied to the optical fiber or of both from a low level to an operating level when an off-to-on transition of the signal light is detected.

BRIEF DESCRIPTION OF THE DRAWINGS

FIG. 14 is a block diagram showing the configuration of an LD controller;

FIG. 15 is a block diagram showing the configuration of an optical modulator controller.

DESCRIPTION OF THE PREFERRED EMBODIMENTS

Before describing the preferred embodiments according to the present invention, examples of the related art are given with reference to the accompanying drawings.

Figure 1:
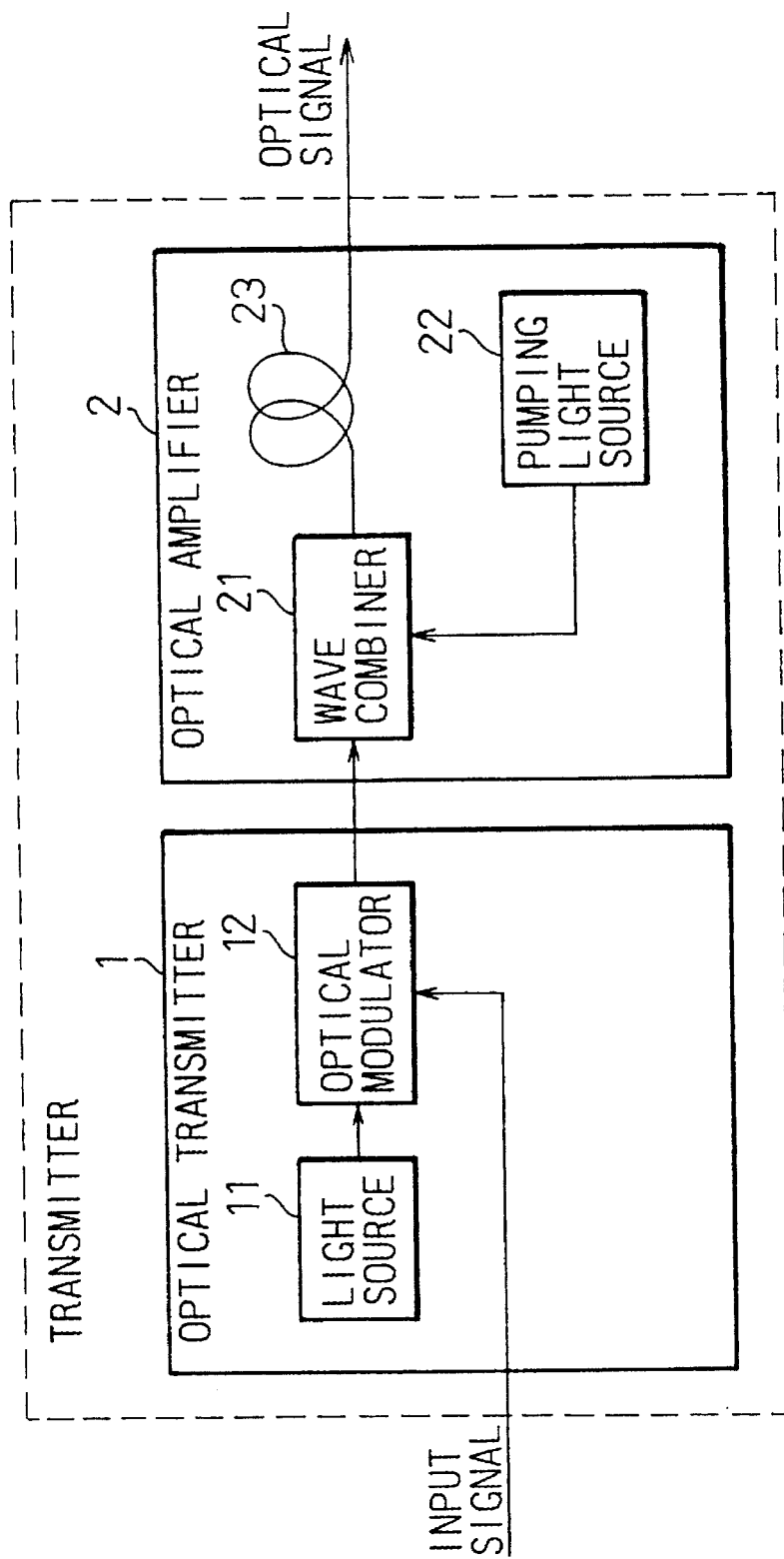
FIG. 1 is a block diagram showing the configuration of a transmitter having an optical amplifier according to the related art.

FIG. 1 is a block diagram showing the configuration of a transmitter in the related art. In the figure, the numeral 1 designates an optical transmitter for generating an optical signal, and 2 indicates an optical amplifier for amplifying the optical signal for transmission. The optical transmitter 1 includes a light source 11 constructed from a laser diode (LD), and an optical modulator 12 constructed from an LN modulator (LiNbO$_3$ Optical Guided-Wave Modulator). The light source 11 generates continuous light based on a direct-current input from a driver not shown. The optical modulator 12 modulates the continuous light from the light source 11 with an input electrical signal, and generates an optical signal in the form of a modulated light beam.

The optical amplifier 2 includes a wave combiner 21 constructed from a waveguide-division multiplexer (WDM), a pumping light source 22 constructed from a laser diode (LD), and an erbium-doped fiber (EDF) 23. The pumping light source 22 generates pumping light in the form of continuous light to excite the EDF 23, while the wave combiner 21 combines the signal light from the optical transmitter 1 with the pumping light from the pumping light source 22, and supplies the combined light to the EDF 23. With the pumping light, the EDF 23 is raised to a higher energy state; in this state, when signal light is input, an amplified optical signal is output.

Figure 2:
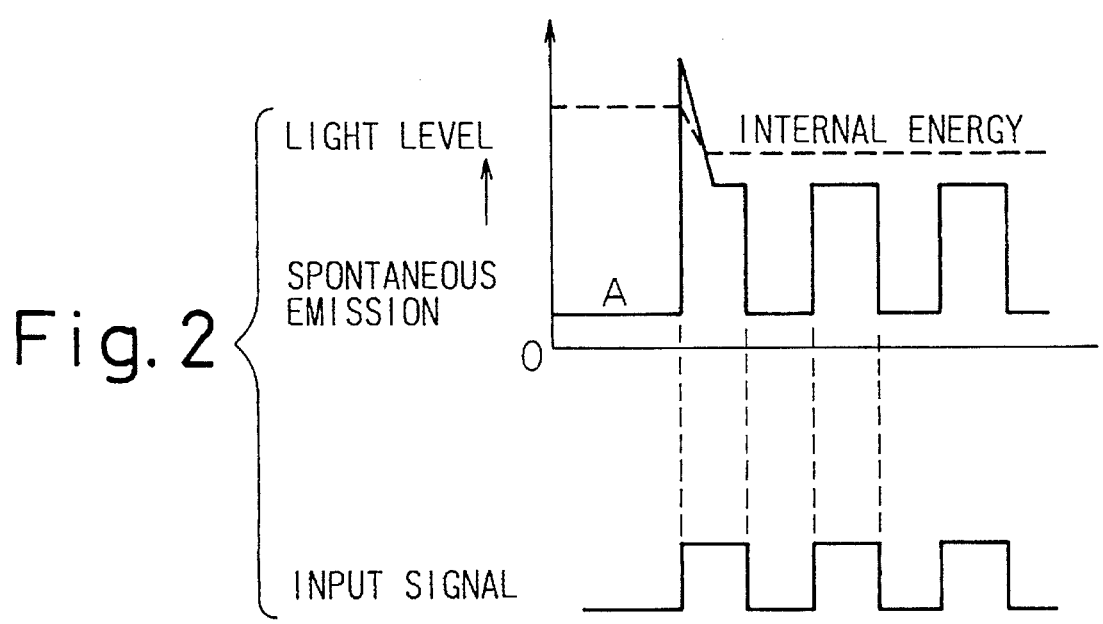
FIG. 2 is a waveform diagram explaining the occurrence of surge light.

FIG. 2 illustrates an optical signal output from the transmitter of the related art. The light level of the optical signal output corresponding to the input signal is shown by a solid line. When the input signal is in the space state, the optical signal output is at the level of the spontaneous emission shown by A. When no input signal is present for a prolonged time, the internal energy of the EDF increases, as shown by a dashed line, because of the pumping light from the pumping LD. In this condition, when signal light is input, the output light level abruptly increases at the rising edge of the first pulse, producing a light surge and causing the internal energy to drop, then settling to produce a normally amplified optical signal output.

The preferred embodiments of the present invention will now be described with reference to the accompanying drawings.

Figure 3:
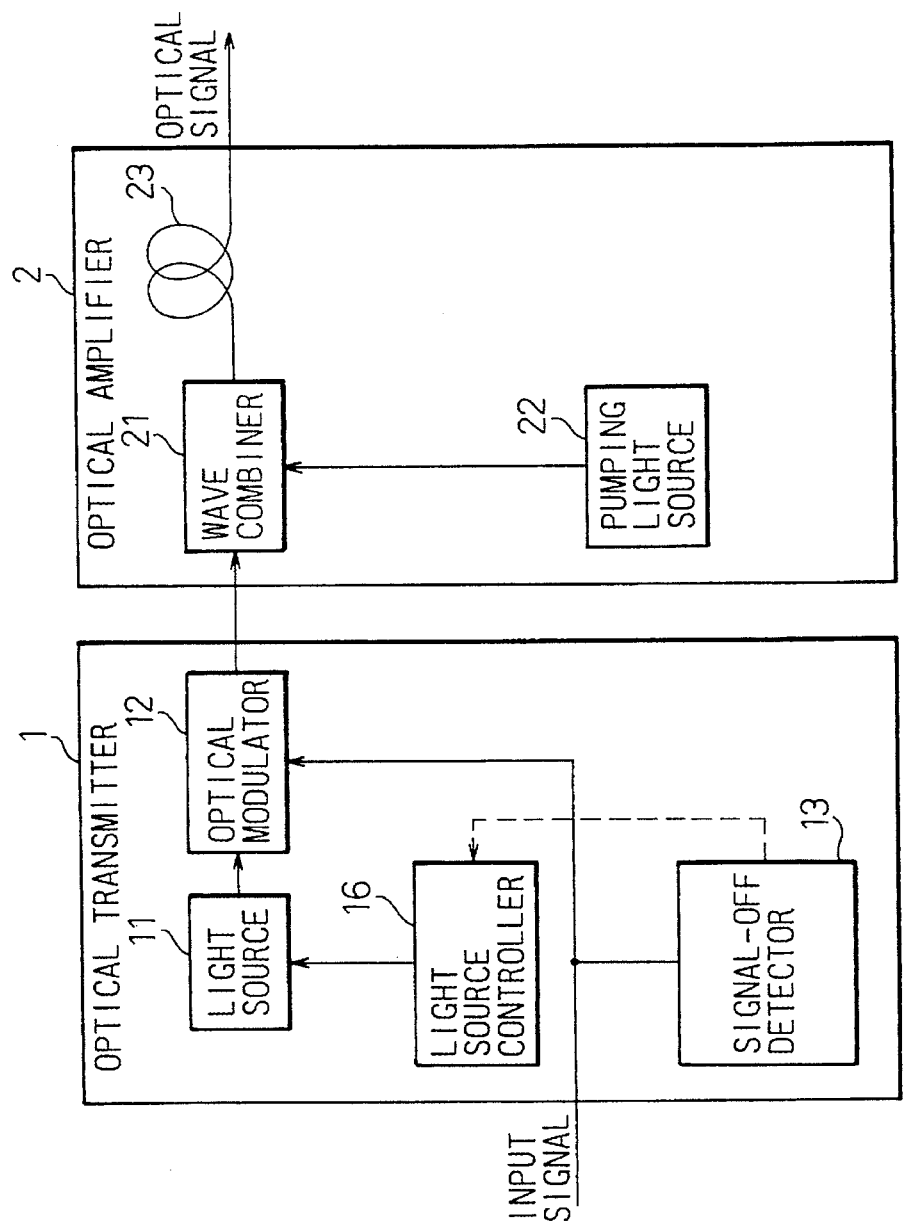
FIG. 3 is a block diagram showing one embodiment of the present invention.

FIG. 3 shows one embodiment of the present invention. In the figure, the parts corresponding to those shown in FIG. 1 are designated by the same reference numerals.

In the optical transmitter 1, a signal-off detector 13 monitors the presence or absence of a data signal input to the optical modulator 12 by detecting the input signal being supplied in the form of an electrical signal. When an off state of the input signal is detected by the signal-off detector 13, the light-emitting action of the light source 11 that is supplying direct-current light to the optical modulator 12 is stopped under the control of a light source controller 16.

The next time the input signal is on, the light source controller 16 exerts control so that the light generated by the light source 11 rises gradually. At this time, the EDF 23 is at the highest energy level, since the pumping light source 22 has been in operation throughout the off period of the light source 11. However, the level of the optical signal input to the EDF 23 is kept low at the start of the rising of the input signal (data signal), and therefore, no light surge occurs in the optical amplifier 2.

Figure 4:
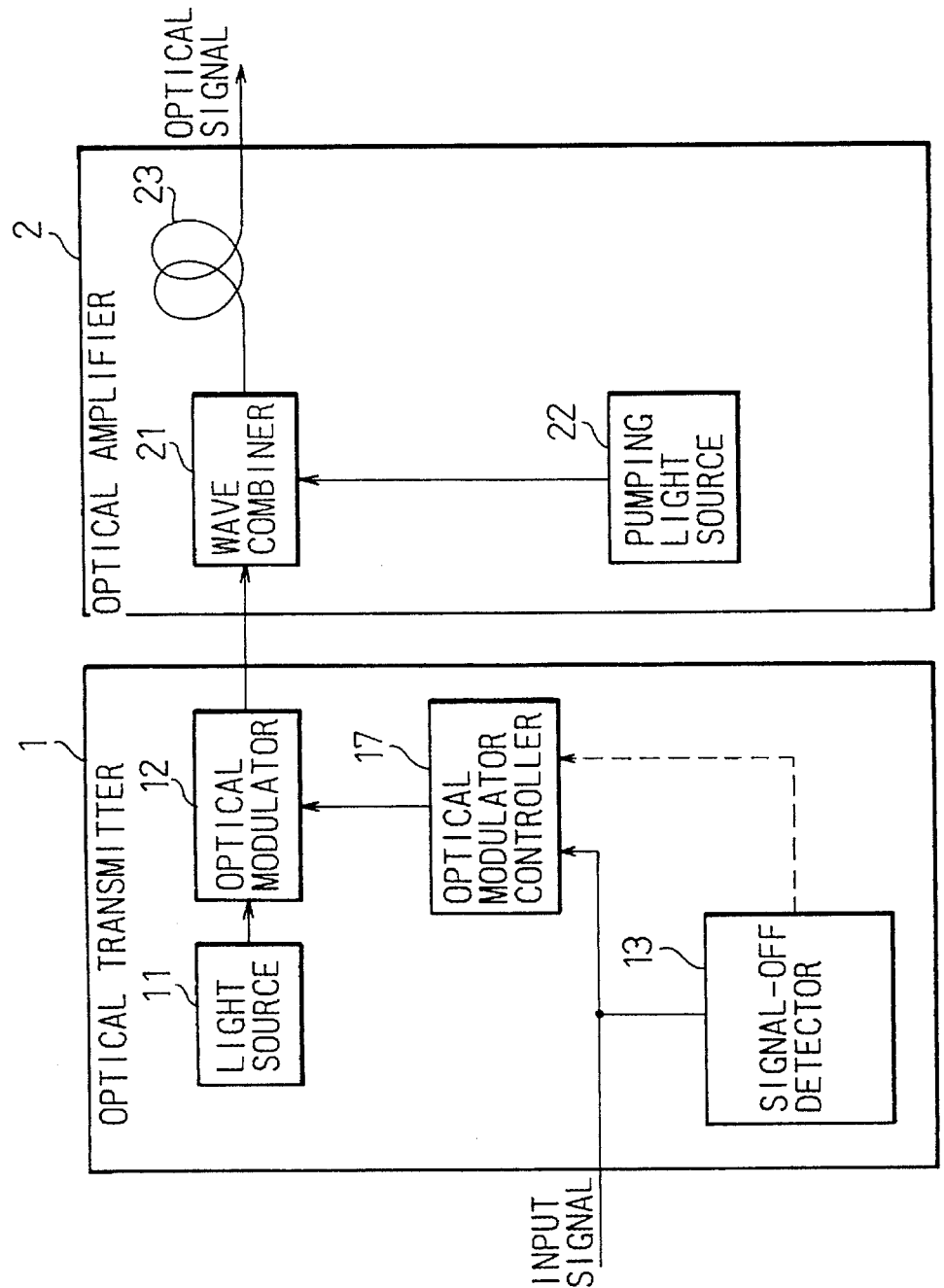
FIG. 4 is a block diagram showing another embodiment of the present invention; g

FIG. 4 shows another embodiment of the present invention. In the figure, the parts corresponding to those shown in FIG. 1 are designated by the same reference numerals.

In the optical transmitter 1, the signal-off detector 13 monitors the presence or absence of a data signal input to the optical modulator 12, an LN modulator, by detecting the input signal being supplied in the form of an electrical signal. When an off state of the input signal is detected by the signal-off detector 13, the operation of the optical modulator 12 is stopped under the control of an optical modulator controller 17.

The next time the input signal is on, the optical modulator controller 17 controls the optical modulator 12 so that the level of the modulated output light rises gradually. At this time, the EDF 23 is at the highest energy level, as in the embodiment shown in FIG. 3, since the pumping light source 22 has been in operation throughout the off period of the optical modulator 12. However, the level of the optical signal input to the EDF 23 is kept low at the start of the rising of the input signal (data signal), and therefore, no surge light occurs in the optical amplifier 2.

Figure 5:
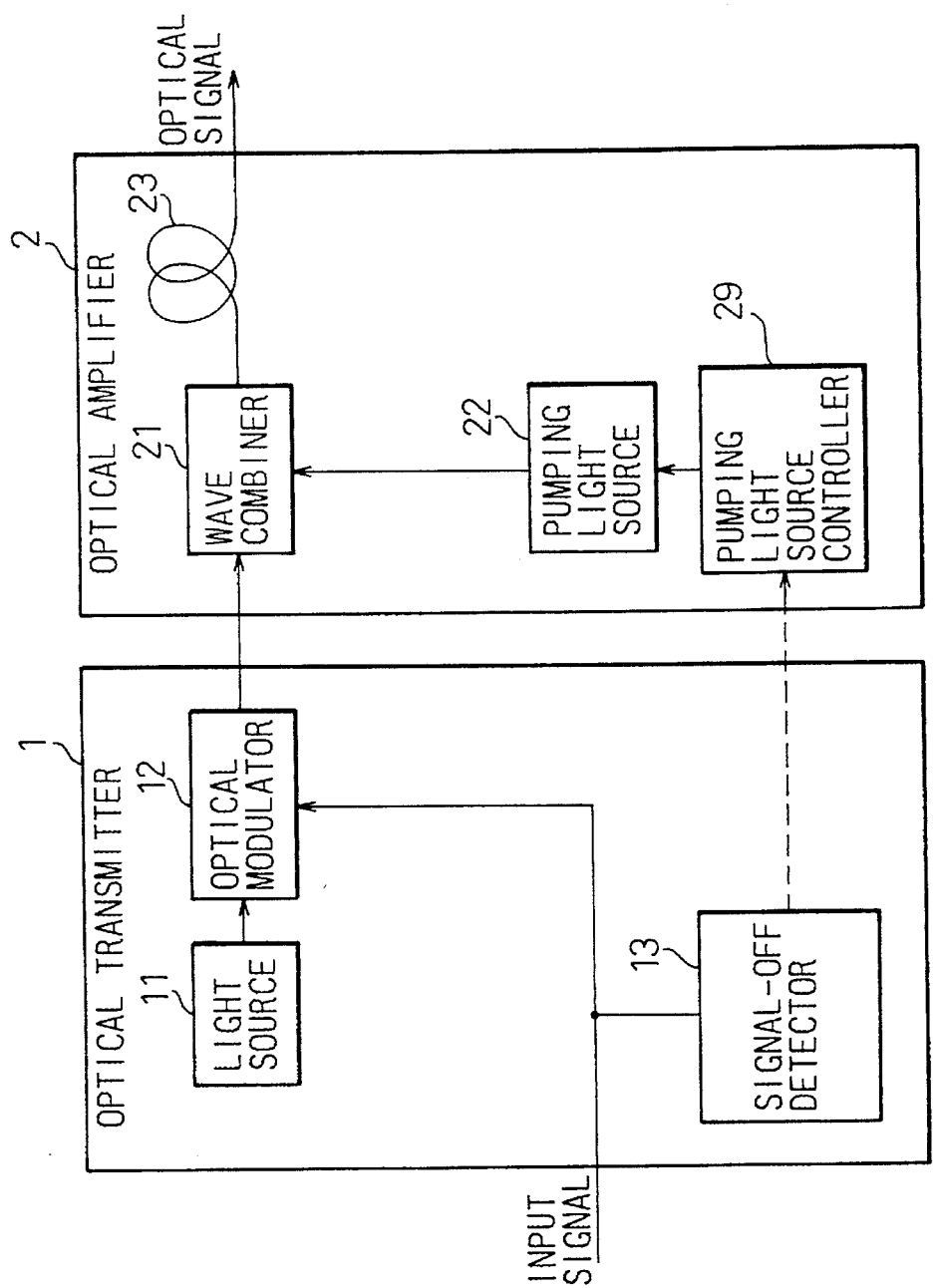
FIG. 5 is a block diagram showing another embodiment of the present invention.

FIG. 5 shows another embodiment of the present invention. In the figure, the parts corresponding to those shown in FIG. 1 are designated by the same reference numerals.

In the optical transmitter 1, the signal-off detector 13 monitors the presence or absence of a data signal input to the optical modulator 12 by detecting the input signal being supplied in the form of an electrical signal. When an off state of the input signal is detected by the signal-off detector 13, the light-emitting action of the pumping light source 22 is stopped under the control of a pumping light source controller 29.

The next time the input signal is on, the pumping light source controller 29 controls the pumping light source 22 so that the pumping light rises gradually. The energy level of the EDF 23 is therefore low at the start of the rising of the input signal (data signal), so that no surge light occurs in the optical amplifier 2.

Figure 6:
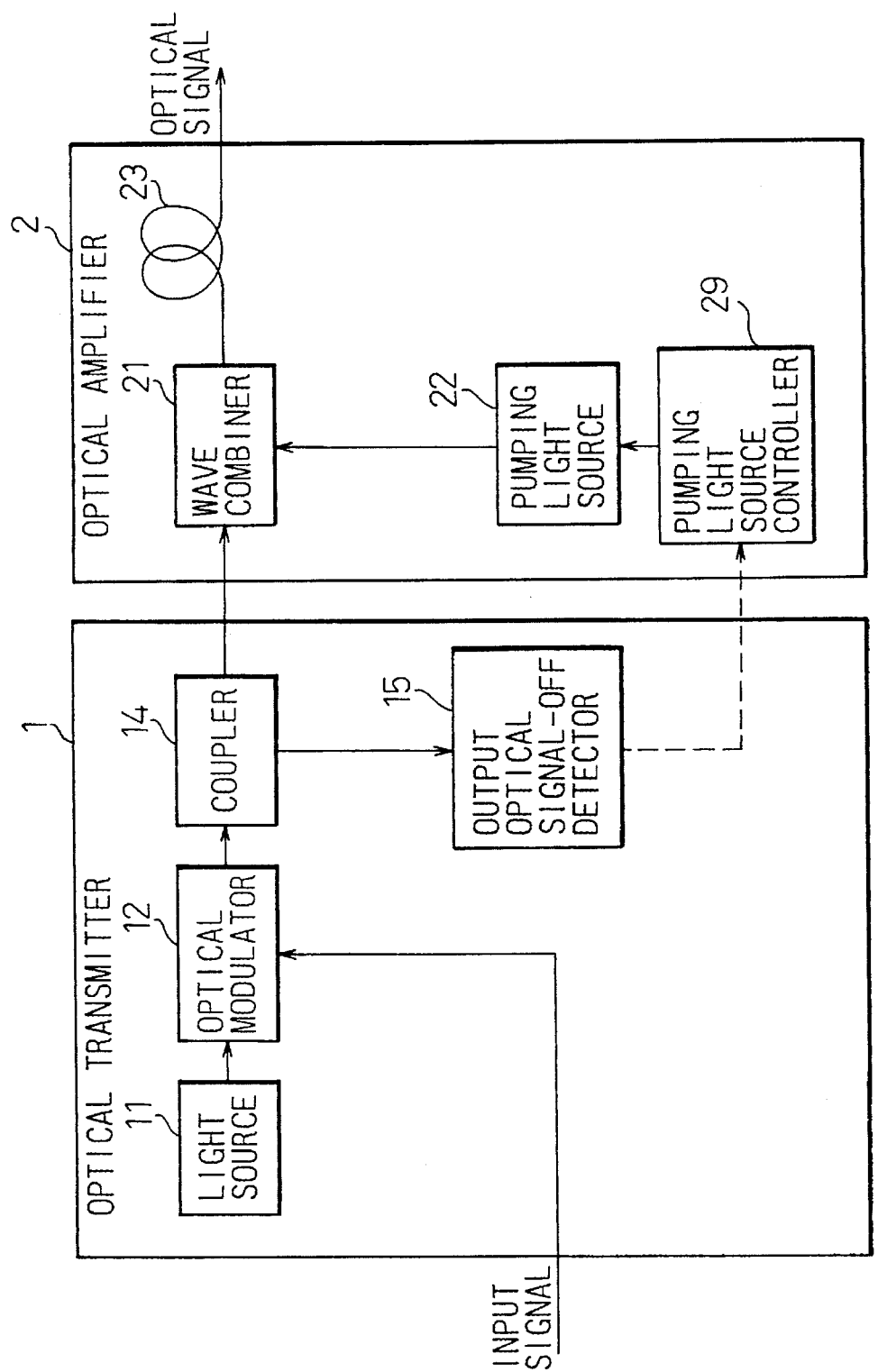
FIG. 6 is a block diagram showing another embodiment of the present invention.

FIG. 6 shows another embodiment of the present invention. In the figure, the parts corresponding to those shown in FIG. 1 are designated by the same reference numerals.

In the optical transmitter 1, an output optical signal-off detector 15 monitors the presence or absence of a modulated light output in the optical transmitter 1 by detecting an optical signal separated by a coupler 14 from the optical signal output from the optical modulator 12. When an off state of the optical signal output is detected by the output optical signal-off detector 15, the light-emitting action of the pumping light source 22 is stopped under the control of the pumping light source controller 29 in the optical amplifier 2.

The next time the input signal is on and, therefore, the optical signal output in the optical transmitter 1 is on again, the pumping light source controller 29 controls the pumping light source 22 so that the pumping light rises gradually. The energy level of the EDF 23 is therefore low at the start of the rising of the input signal (data signal), so that no surge light occurs in the optical amplifier 2.

Figure 7:
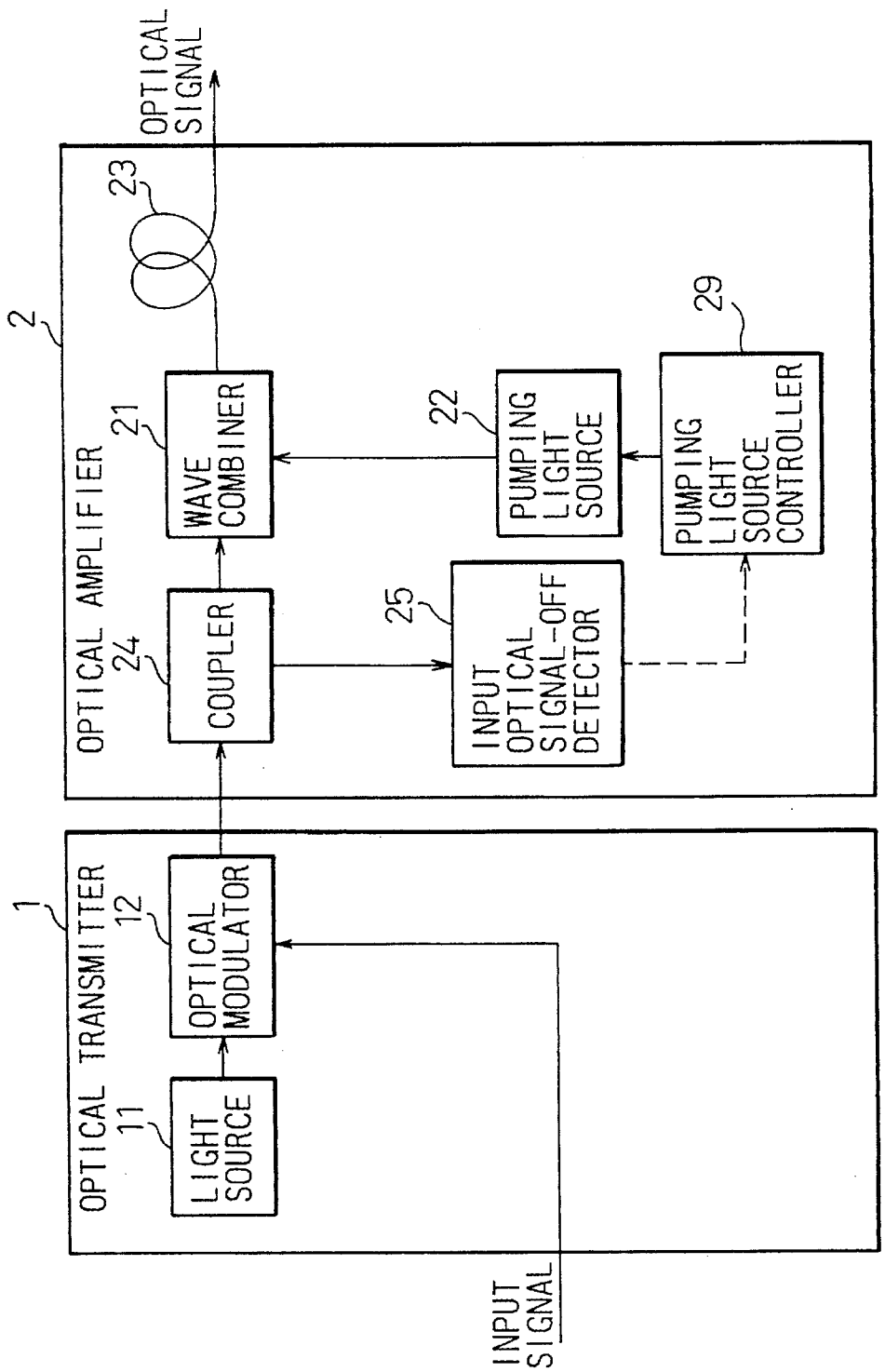
FIG. 7 is a block diagram showing another embodiment of the present invention.

FIG. 7 shows another embodiment of the present invention. In the figure, the parts corresponding to those shown in FIG. 1 are designated by the same reference numerals.

In the optical amplifier 2, an input optical signal-off detector 25 monitors the presence or absence of a modulated light input to the optical amplifier 2 by detecting an optical signal separated by a coupler 24 from the optical signal input to the optical amplifier 2. When an off state of the optical signal input is detected by the input optical signal-off detector 25, the light-emitting action of the pumping light source 22 is stopped under the control of the pumping light source controller 29 in the optical amplifier 2.

The next time the input signal is on and, therefore, the optical signal input to the optical amplifier 2 is on again, the pumping light source controller 29 controls the pumping light source 22 so that the pumping light rises gradually. The energy level of the EDF 23 is therefore low at the start of the rising of the input signal (data signal), so that no surge light occurs in the optical amplifier 2.

Figure 8:
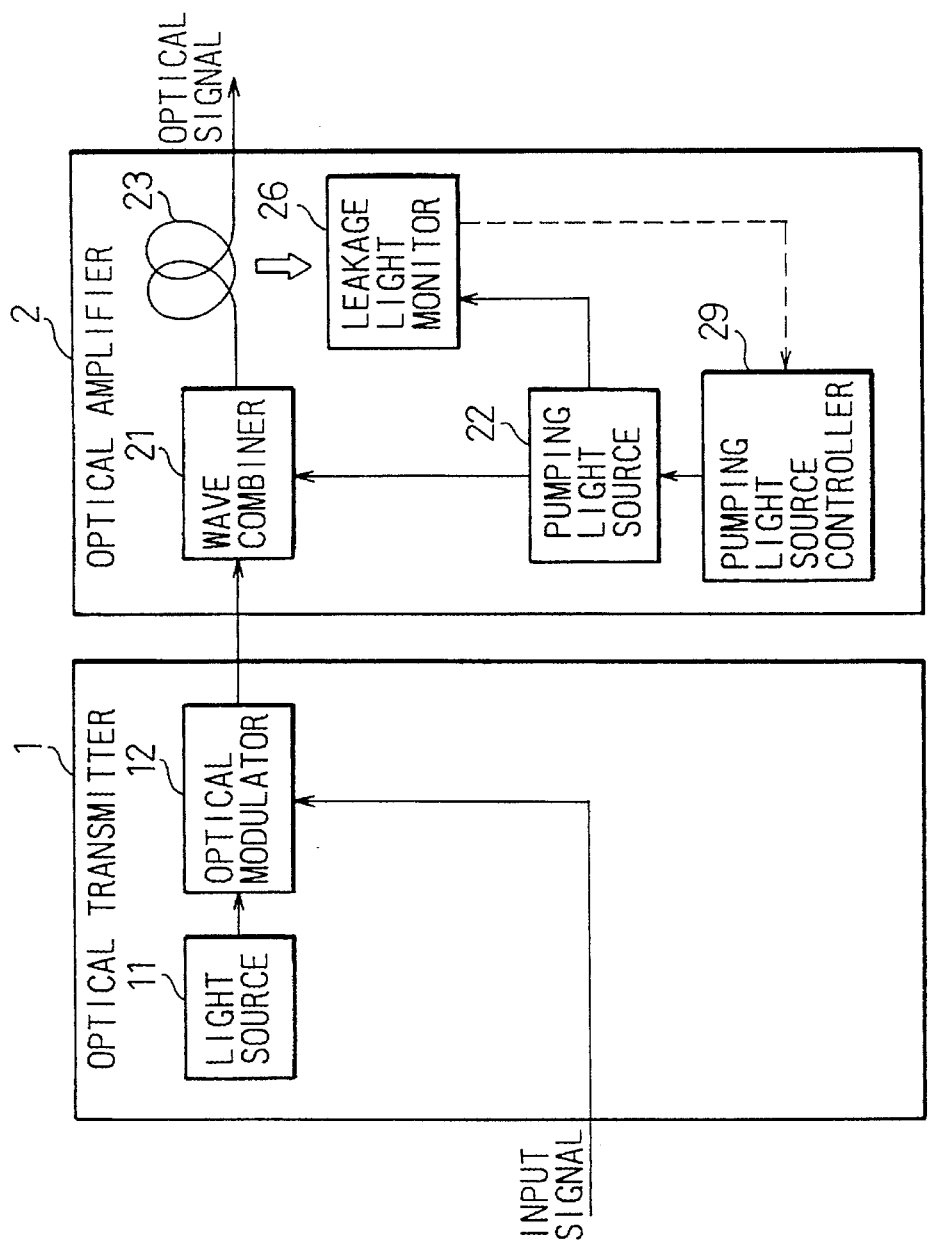
FIG. 8 is a block diagram showing another embodiment of the present invention.

FIG. 8 shows another embodiment according to the present invention. In the figure, the parts corresponding to those shown in FIG. 1 are designated by the same reference numerals.

In the optical amplifier 2, a leakage light monitor 26 monitors the presence or absence of a modulated light input to the optical amplifier 2 by detecting leakage light from the EDF 23 and backward light from the pumping light source 22, an LD, and comparing detection signals between them. When an off state of the modulated light input is detected by the leakage light monitor 26, the light-emitting action of the pumping light source 22 is stopped under the control of the pumping light source controller 29 in the optical amplifier 2.

The next time the input signal is on and, therefore, the presence of the modulated light input is detected by the leakage light monitor 26, the pumping light source controller 29 controls the pumping light source 22 so that the pumping light rises gradually. The energy level of the EDF 23 is therefore low at the start of the rising of the input signal (data signal), so that no surge light occurs in the optical amplifier 2.

Figure 9:
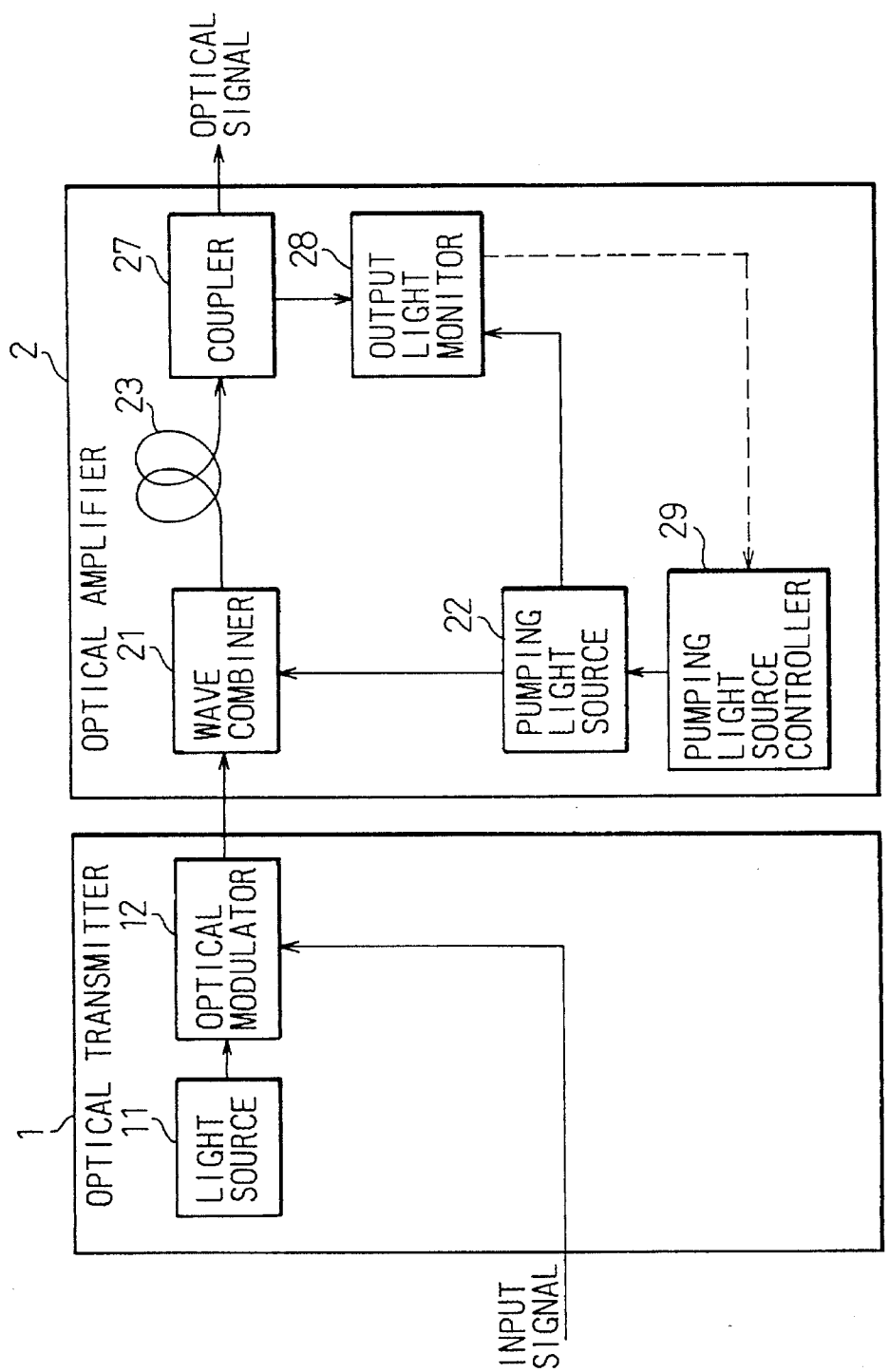
FIG. 9 is a block diagram showing another embodiment of the present invention.

FIG. 9 shows another embodiment of the present invention.

In the optical amplifier 2, an output light monitor 28 monitors the presence or absence of a modulated light output in the optical amplifier 2 by detecting output light separated by a coupler 27 from the optical signal output in the optical amplifier 2 and backward light from the pumping light source 22, an LD, and comparing detection signals between them. When an off state of the modulated light output is detected by the output light monitor 28, the light-emitting action of the pumping light source 22 is stopped under the control of the pumping light source controller 29 in the optical amplifier 2.

The next time the input signal is on and, therefore, the presence of the modulated light output is detected by the output light monitor 28, the pumping light source controller 29 controls the pumping light source 22 so that the pumping light rises gradually. The energy level of the EDF 23 is therefore low at the start of the rising of the input signal (data signal), so that no surge light occurs in the optical amplifier 2.

Figure 10:
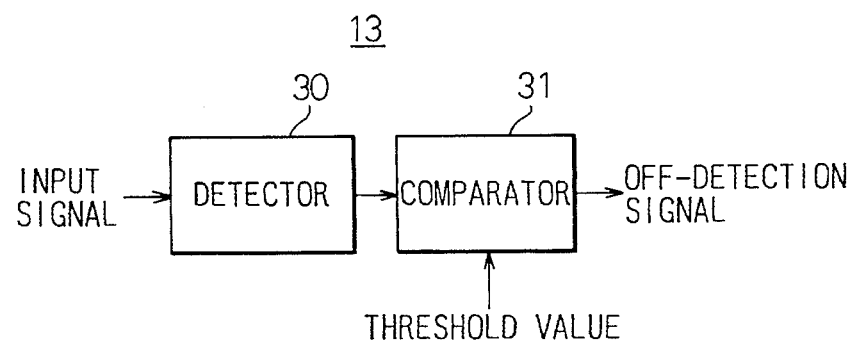
FIG. 10 is a block diagram showing the configuration of a signal-off detector.

FIG. 10 shows an example of the configuration of the signal-off detector 13 used in the embodiments described with reference to FIGS. 3 to 5. In the figure, a detector 30 detects the input electrical signal and produces an output, and a comparator 31 compares the output with a prescribed threshold value and generates an off-detection signal indicating an off or on state of the input signal (data signal) which is sent to the optical transmitter 1.

Figure 11:
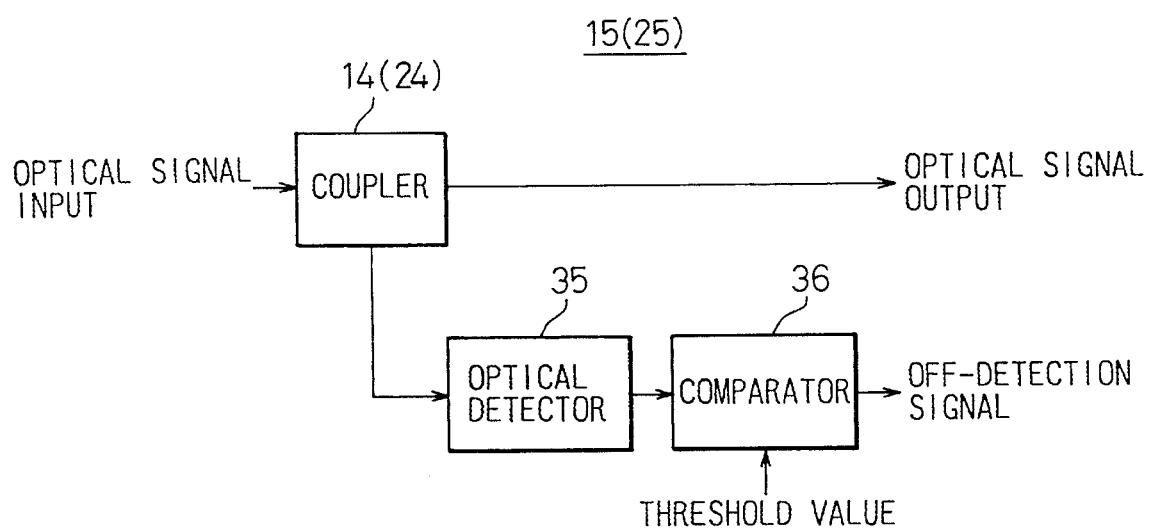
FIG. 11 is a block diagram showing the configuration of an optical signal-off detector.

FIG. 11 shows an example of the configuration of the output optical signal-off detector 15 or input optical signal-off detector 25 used in the embodiment described with reference to FIG. 6 or 7.

An optical detector 35, which consists of a PD or APD, detects the optical signal input separated by the coupler 14 (or 24) and produces an output in the form of an electrical signal. A comparator 36 compares the output with a prescribed threshold value and generates an off-detection signal indicating an off or on state of modulated light in the optical signal output of the optical transmitter 1 (or the optical signal input of the optical amplifier 2).

Figure 12:
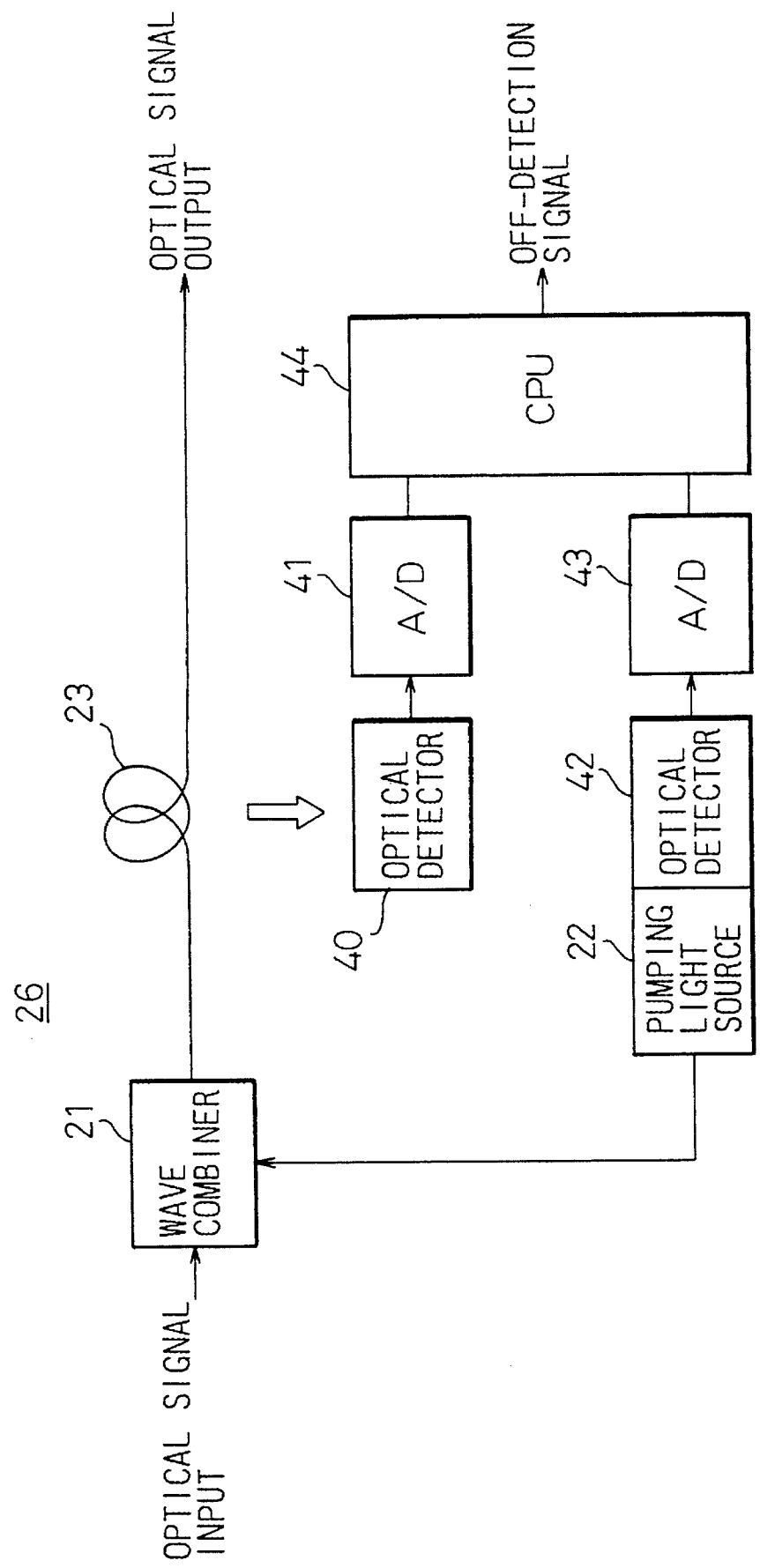
FIG. 12 is a block diagram showing the configuration of a leakage light monitor.

FIG. 12 shows an example of the configuration of the leakage light monitor 26 used in the embodiment described with reference to FIG. 8.

An optical detector 40, which consists of a PD or APD, detects leakage light from the EDF 23 and produces an output in the form of an electrical signal. An analog-digital converter (A/D) 41 converts the output to a digital signal. An optical detector 42, which consists of a PD or APD, detects backward light from the pumping light source 22 and produces an output in the form of an electrical signal. An analog-digital converter (A/D) 43 converts the output to a digital signal. A central processing unit (CPU) 44 monitors the state of the optical signal input in the optical amplifier by comparing the outputs of the A/Ds 41 and 43, and generates an off-detection signal indicating an off or on state of the modulated light input in the EDF 23.

Figure 13:
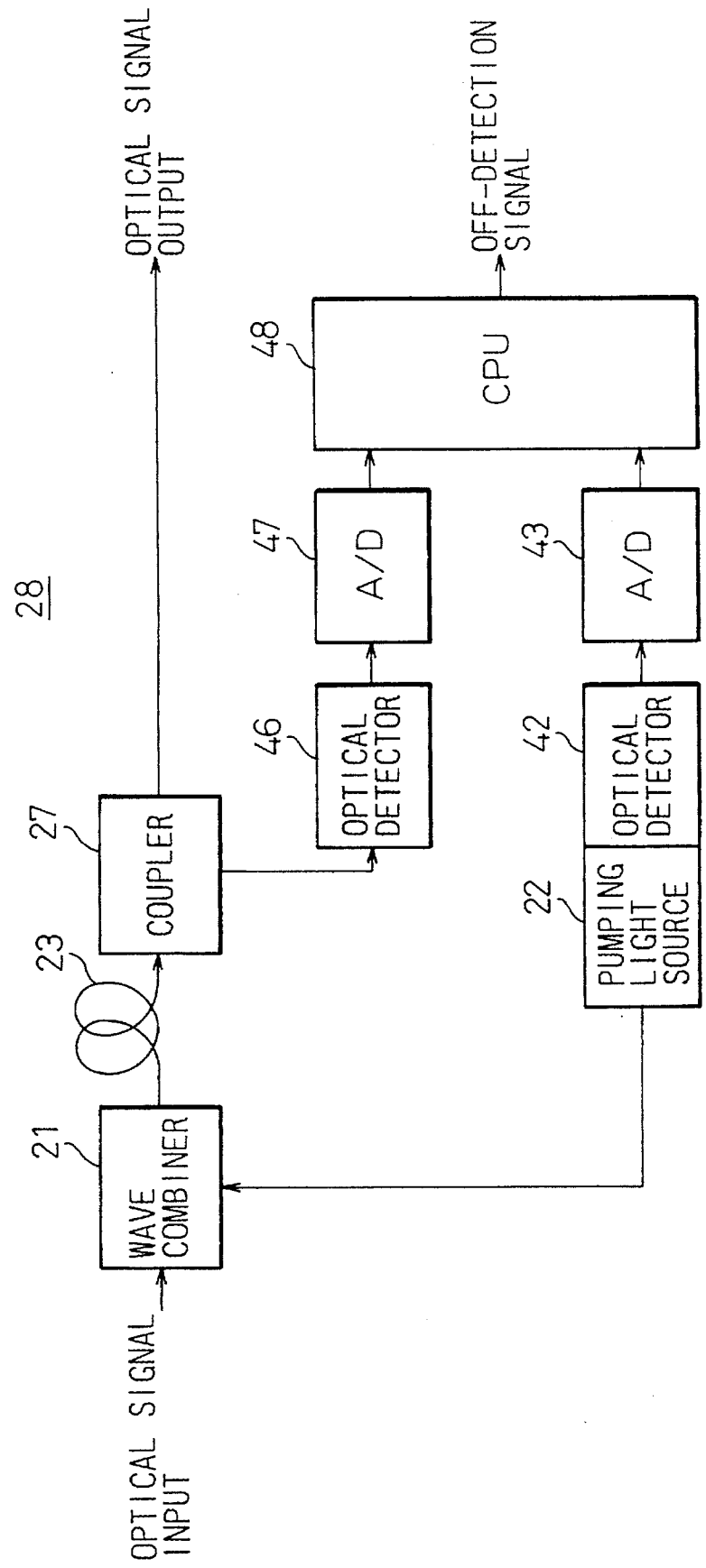
FIG. 13 is a block diagram showing the configuration of an output light monitor.

FIG. 13 shows an example of the configuration of the output light monitor 28 used in the embodiment described with reference to FIG. 9.

An optical detector 46, which consists of a PD or APD, detects the optical signal input separated by the coupler 27 and produces an output in the form of an electrical signal. An analog-digital converter (A/D) 47 converts the output to a digital signal. A central processing unit (CPU) 48, monitors the state of the optical signal input in the optical amplifier by comparing the outputs of the A/D 43 and 47, and generates an off-detection signal indicating an off or on state of the modulated light in the output of the optical amplifier 2.

FIG. 14 shows an example of the configuration of the light source controller 16 or pumping light source controller 29 used in the embodiments described with reference to FIG. 3 or FIGS. 5 to 9.

A resistor 50, a capacitor 51, and a diode 52 together form an integrator circuit, which generates an output signal that varies gradually with a time constant τ in accordance with an LD on/off control signal that varies stepwise in response to an on/off action. A driver 53, which consists of an integrated circuit (IC) or a large-scale integrated circuit (LSI), produces an output to drive the light source 11 (or the pumping light source 22).

By applying the gradually varying output signal from the integrator circuit to an LD bias current control input of the driver 53, the rising of the light generated by the light source 11 (or the pumping light source 22) is controlled during the off-to-on transition period so that the light output increases gradually.

Figure 16:
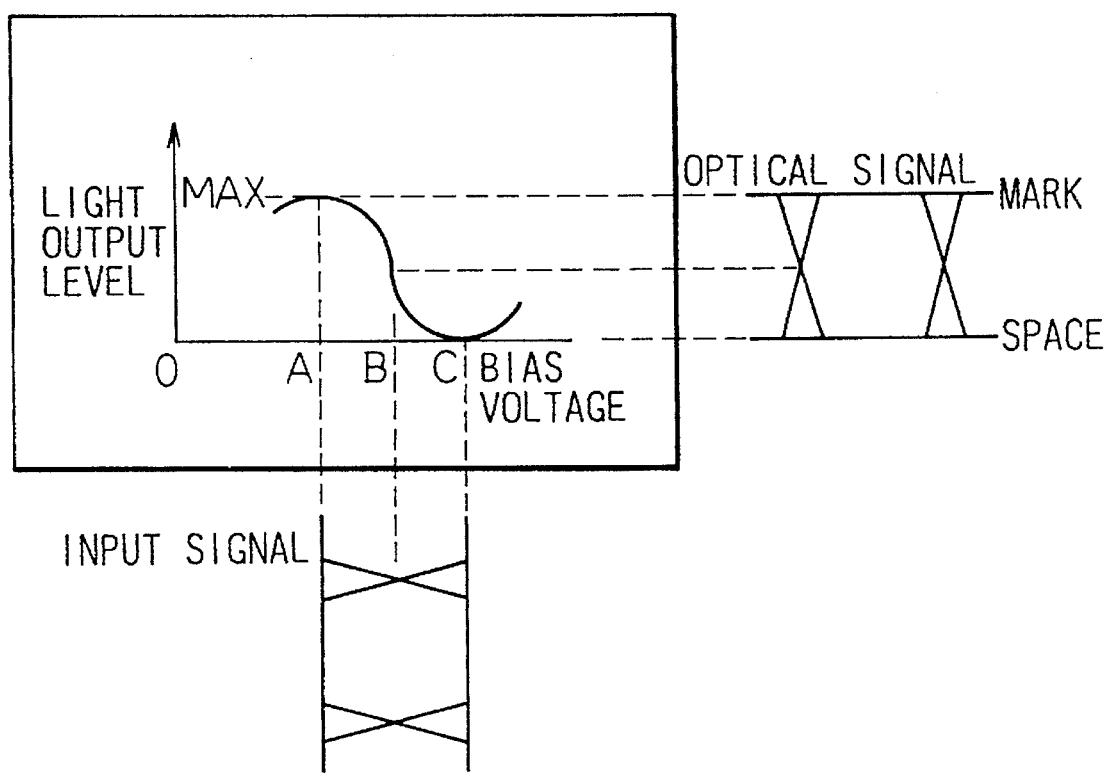
FIG. 16 is a diagram showing the quenching characteristic of an optical modulator.

FIG. 15 shows an example of the configuration of the optical modulator controller 17 used in the embodiment described with reference to FIG. 4. FIG. 16 shows the quenching characteristic of the optical modulator 12.

The optical modulator 12 is constructed from a known LN modulator, and is essentially a Mach-Zehnder interferometer whose construction is such that an optical waveguide 55 through which continuous light propagates is split into two waveguides, with a grounding electrode 56 coupled to one waveguide and a modulation electrode 57 to the other waveguide, the two waveguides being merged to produce modulated light. The numerals 58 and 59 indicate electrodes at both ends of the modulation electrode 57.

When modulation input is applied to both ends of the modulation electrode 57, phase-modulated light beams of opposite signs are generated in the two split waveguides because of the electro-optic effect, and these phase-modulated light beams interfere with each other where the two waveguides merge, thereby producing an intensity-modulated output light beam.

In the optical modulator controller 17, an LN driving circuit 60 generates a data signal which is applied via a capacitor 61 to one electrode 58 of the modulation electrode 57 in the optical modulator 12. A bias supply control circuit 62 generates a bias voltage to be supplied to the one electrode 58 of the modulation electrode 57 in the optical modulator 12, and also controls the operation of the LN driving circuit 60. Also included is a load resistor 63 which is connected between ground and the other electrode 59 of the modulation electrode 57 in the optical modulator 12.

The optical modulator 12 has a characteristic that its light output level varies between maximum value (MAX) and 0 when the bias voltage applied to the one electrode 58 is varied between maximum value A and minimum value C with reference value B as the center, as shown in FIG. 16. Therefore, by supplying a bias reference voltage corresponding to B from the bias supply control circuit 62 and, at the same time, applying an input signal varying between maximum value A and minimum value C from the LN driving circuit 60 via the capacitor 61 in superimposing fashion on the bias reference voltage, an optical signal can be obtained that changes between mark and space in correspondence to the maximum and minimum values of the light output level.

In the present invention, the bias supply control circuit 62 works to stop the operation of the LN driving circuit 60 and supplies the minimum value C as the bias voltage in accordance with the control signal when the input signal goes into the off state. When the input signal is on again, the LN driving circuit 60 is enabled, and the bias voltage is gradually increased from minimum value C to reference value B. As a result, the modulated light output level of the optical modulator 12 rises gradually.

As described above, according to the present invention, in an optical amplifier/transmitter apparatus that amplifies light using an EDF, the presence or absence of a data signal based on an input signal is detected; when the input signal is off, control is performed to stop the operation of the part concerned that could cause surge light during the off-to-on transition, and when the input signal is on again, control is performed so that the part concerned starts slowly, thus suppressing the occurrence of surge light in the EDF by either keeping the energy level of the EDF low at the start of the rising of the input signal or reducing the level of the optical signal input to the EDF. This provides a reliable means to prevent surge light from being transmitted from the optical amplifier/transmitter apparatus.

We claim:

1. A method of preventing the occurrence of surge light in an optical amplifier that amplifies signal light input to said optical amplifier by introducing the signal light into an optical fiber supplied with pumping light, comprising the steps of:

a) detecting an off-to-on transition of the signal light; and b) when the off-to-on transition of the signal light is detected, increasing over a period of time the energy level of at least one of the signal light introduced into the optical fiber and the pumping light supplied to the optical fiber, from a first level to a second level, said first level being less than said second level.

2. A method according to claim 1, wherein the signal light is produced by optically modulating light from a light source with an electrical signal, and in step a), the off-to-on transition of the signal light is detected by detecting an off-to-on transition in the electrical signal.

3. A method according to claim 2, wherein step a) includes substeps of detecting the electrical signal and comparing the detected output with a preselected threshold value.

4. A method according to claim 1, further comprising a step c) of separating a portion of the signal light introduced into the optical fiber, wherein in step a), the off-to-on transition of the signal light is detected by detecting an off-to-on transition in the separated signal light.

5. A method according to claim 4, wherein step a) includes substeps of optically detecting the separated signal light and detecting the off-to-on transition of the input signal light by comparing an output of the optically detected separated signal light with a preselected threshold value.

6. A method according to claim 1, wherein in step a), the off-to-on transition of the signal light is detected by monitoring leakage light from the optical fiber and the pumping light.

7. A method according to claim 6, wherein step a) includes substeps of optically detecting the leakage light from the optical fiber, optically detecting backward light from the light source generating the pumping light, and detecting the off-to-on transition of the signal light by comparing the optically detected output of the leakage light with the optically detected output of the backward light.

8. A method according to claim 1, further comprising the step of separating a portion of output light from the optical fiber, wherein in step a), the off-to-on transition of the signal light is detected by monitoring the separated output light of the optical fiber and the pumping light.

9. A method according to claim 8, wherein step a) includes substeps of optically detecting the separated output light of the optical fiber, optically detecting backward light from the light source generating the pumping light, and detecting the off-to-on transition of the signal light by comparing the optically detected output of the separated output light with the optically detected output of the backward light.

10. A method according to claim 1, wherein the signal light is produced by optically modulating light from a light source with an electrical signal, and in step b), the energy level of the signal light introduced into the optical fiber is increased over said period of time by increasing the energy level of the light source over said period of time.

11. A method according to claim 10, wherein step b) includes substeps of extending over said period of time a signal indicating the detection of the off-to-on transition of the signal light, and controlling the light source in correspondence to the extended signal.

12. A method according to claim 1, wherein the input signal light is produced by optically modulating light from a light source with an electrical signal by using an optical modulator, and in step b), the energy level of the signal light introduced into the optical fiber is increased over said period of time by controlling the optical modulator.

13. A method according to claim 12, wherein step b) includes substeps of increasing over said period of time a bias voltage to be supplied to the optical modulator, and supplying the bias voltage to the optical modulator.

14. A method according to claim 1, wherein in step b), the energy level of the pumping light supplied to the optical fiber is increased by increasing over said period of time the energy level of a light source generating the pumping light.

15. A method according to claim 14, wherein step b) includes substeps of extending over said period of time a signal indicating the detection of the off-to-on transition of the signal light, and controlling the light source according to the extended signal.

16. An apparatus for preventing the occurrence of surge light in an optical amplifier that amplifies signal light input to said optical amplifier by introducing the signal light into an optical fiber supplied with pumping light, comprising:

an off-to-on transition detecting circuit for detecting an off-to-on transition of the signal light; and a light level control circuit for increasing over a time period the energy level of at least one of the signal light introduced into the optical fiber and the pumping light supplied to the optical fiber, from a first level to a second level when the off-to-on transition of the signal light is detected by the off-to-on transition detecting circuit, said first level being less than said second level.

17. An apparatus according to claim 16, wherein the signal light is produced by optically modulating light from a light source with an electrical signal, and the off-to-on detecting circuit detects the off-to-on transition of the signal light by detecting an off-to-on transition in the electrical signal.

18. An apparatus according to claim 17, wherein the off-to-on transition detecting circuit includes:

a detector for detecting the electrical signal; and a comparator for comparing the detected output with a preselected threshold value.

19. An apparatus according to claim 16, further comprising a coupler for separating a portion of the signal light introduced into the optical fiber, wherein the off-to-on transition detecting circuit detects the off-to-on transition of the signal light by detecting an off-to-on transition in the signal light separated by the coupler.

20. An apparatus according to claim 19, wherein the off-to-on transition detecting circuit includes:

an optical detector for optically detecting the signal light separated by the coupler; and a comparator for detecting the off-to-on transition of the signal light by comparing an output of the optical detector with a preselected threshold value.

21. An apparatus according to claim 16, wherein the off-to-on transition detecting circuit detects the off-to-on transition of the signal light by monitoring leakage light from the optical fiber and the pumping light.

22. An apparatus according to claim 21, wherein the off-to-on transition detecting circuit includes:

a first optical detector for optically detecting the leakage light from the optical fiber;

a second optical detector for optically detecting backward light from the light source generating the pumping light; and a comparator for detecting the off-to-on transition of the signal light by comparing the outputs of the first and second optical detectors.

23. An apparatus according to claim 16, further comprising a coupler for separating a portion of output light from the optical fiber, wherein the off-to-on transition detecting circuit detects the off-to-on transition of the signal light by monitoring the output light of the optical fiber separated by the coupler and the pumping light.

24. An apparatus according to claim 23, wherein the off-to-on transition detecting circuit includes:

a first optical detector for optically detecting the output light of the optical fiber separated by the coupler;

a second optical detector for optically detecting backward light from the light source generating the pumping light; and a comparator for detecting the off-to-on transition of the signal light by comparing the outputs of the first and second detectors.

25. An apparatus according to claim 16, wherein the signal light is produced by an optically modulating light from a light source with an electrical signal, and the light level control circuit increases over said time period the energy level of the signal light introduced into the optical fiber by increasing over said time period the energy level of the light source.

26. An apparatus according to claim 25, wherein the light level control circuit includes:

an integrator for extending over said time period a signal indicating the detection of the off-to-on transition of the signal light; and a light source controller for controlling the light source according to an output from the integrator.

27. An apparatus according to claim 16, wherein the signal light is produced by optically modulating light from a light source with an electrical signal by an optical modulator, and the light level control circuit increases over said time period the energy level of the signal light introduced into the optical fiber by controlling the optical modulator.

28. An apparatus according to claim 27, wherein the light level control circuit includes a bias supply controller for increasing over said time period a bias voltage to be supplied to the optical modulator.

29. An apparatus according to claim 16, wherein the light level control circuit increases over said time period the energy level of the pumping light supplied to the optical fiber by increasing over said time period the energy level of a light source generating the pumping light.

30. An apparatus according to claim 29, wherein the light level control circuit includes:

an integrator for extending over said time period a signal indicating the detection of the off-to-on transition of the signal light; and a light source controller for controlling the light source according to an output from the integrator.

* * * * *